June 8, 1965 W. LEE 3,188,081

DOCUMENT FEEDING SYSTEM

Filed Oct. 29, 1962 4 Sheets-Sheet 1

June 8, 1965 W. LEE 3,188,081

DOCUMENT FEEDING SYSTEM

Filed Oct. 29, 1962 4 Sheets-Sheet 2

United States Patent Office 3,188,081

Patented June 8, 1965

3,188,081
DOCUMENT FEEDING SYSTEM

Walter Lee, Springfield, Va., assignor to Farrington Electronics Inc., Alexandria, Va., a corporation of Massachusetts Filed Oct. 29, 1962, Ser. No. 233,834
15 Claims. (Cl. 271—5)

The present invention relates generally to improvements in high speed document feeding, primarily described as being used with character reading mechanisms and the like, but having utility in almost any feed mechanism, and more particularly to a new and improved method and apparatus for feeding either paper or card documents having varied widths, lengths and thicknesses whereby a versatile feed system is achieved.

In the field of character readers, optical scanners, and the like, recognition apparatus is used for scanning items of information such as alphabetic letters, numerals, etc., on intelligence-bearing documents being fed through a scanning station and converting them to machine language for use with other apparatus. It has been the general practice to employ feed mechanisms of a predetermined internal cyclic nature to perform the document feed operation. Although such devices have served the purpose, they have not proved entirely satisfactory under all conditions of service for the reason that considerable difficulty has been experienced in adapting such feeds to be used with documents of various lengths, widths, thicknesses and weights of paper.

The general purpose of this invention is to provide a document feed system which may be readily adapted to accommodate documents of various lengths, widths, thicknesses and weights of paper. To attain this, the present invention uses a unique document vacuum drive initiated by a vacuum drive pulse of variable duration which is automatically varied in proportion to the length of the document when the input hopper is adjusted to accommodate the correct document size to be used. The feed system further includes error prevention and error detection features and automatic shut-off features to stop the feed in response to such events as a feed failure, the filling of an output stacking pocket to its maximum capacity, and the emptying of the feed hopper, and incorporates anti-document skew provisions and feed path monitor provisions as well as many others to be developed in this specification, all of which provide a feed system for reliably transporting and controlling documents with the accuracy and speeds necessary for high-speed document reading.

An object of the present invention is the provision of novel apparatus for efficiently advancing a document.

Another object of the present invention is the provision of novel apparatus for efficiently advancing a document being used in connection with character recognition equipment.

Still another object is to provide a feed system having a time variable feed pulse which is dependent upon the document length to be used.

Another object of the present invention is a provision for preventing erroneous feed of a document and for separation of documents so that only one document will be fed at any one time.

Another object of the present invention is the provision of shutting off the machine when the feed mechanism has failed to transport a document, when an output receptacle has been filled to its maximum, when two or more documents have failed to have been separated, or when the input hopper is void of documents.

With these and other objects in view, as will hereinafter more fully appear, reference is now made to the following description taken in connection with the accompanying drawings in which:

FIGURE 1 shows an overall isometric view of a document feed system embodying the present invention;

FIGURE 2 discloses a schematic plan view of the document feed system;

Figures 1, 2:
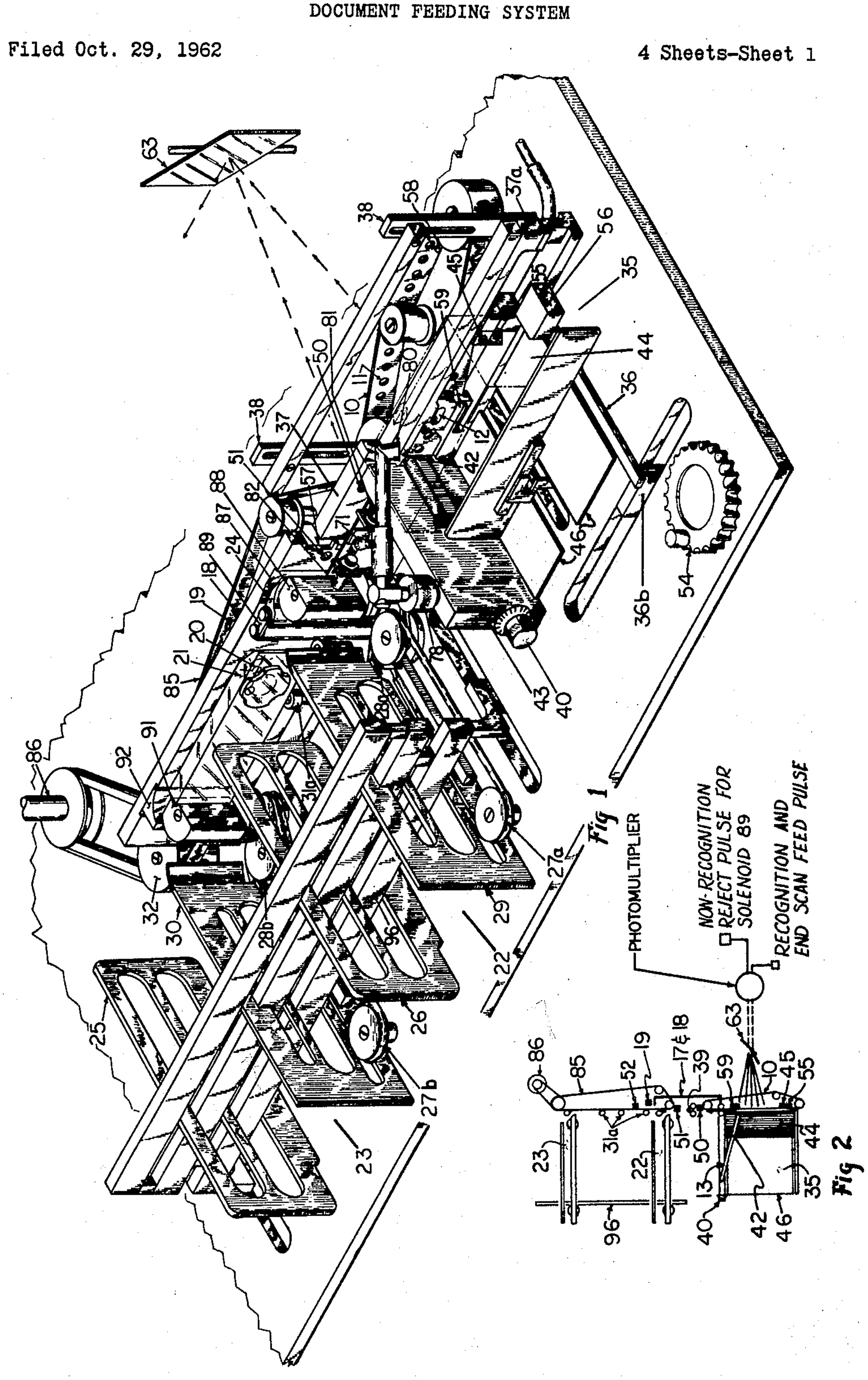
Figures 4, 6A, 6B, 6C:
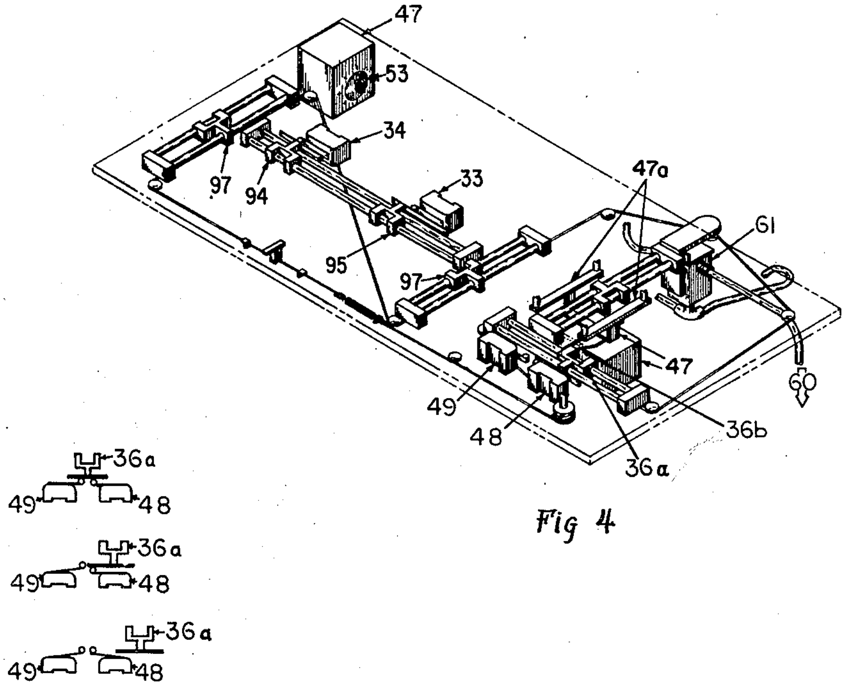
FIGURE 4 illustrates an isometric view, located directly beneath the apparatus as shown in FIGURE 1, of snap-action switches used in the adjustment of document length, the vibrator assembly and the output stacker switching.
Figure 7:
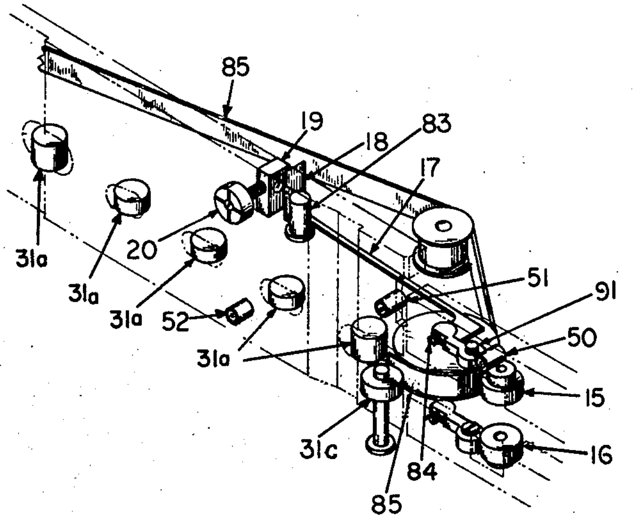
Figure 8:
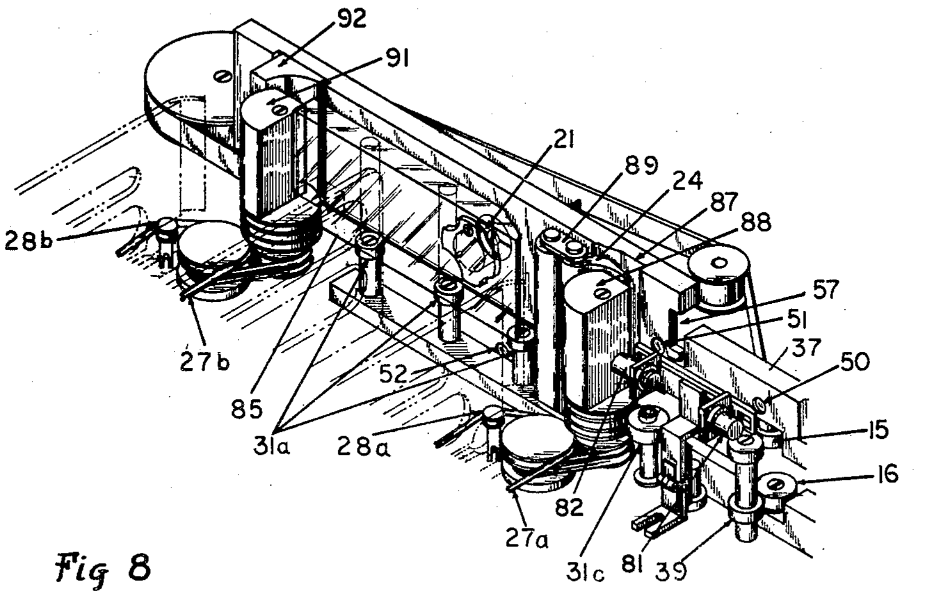
Figure 9:
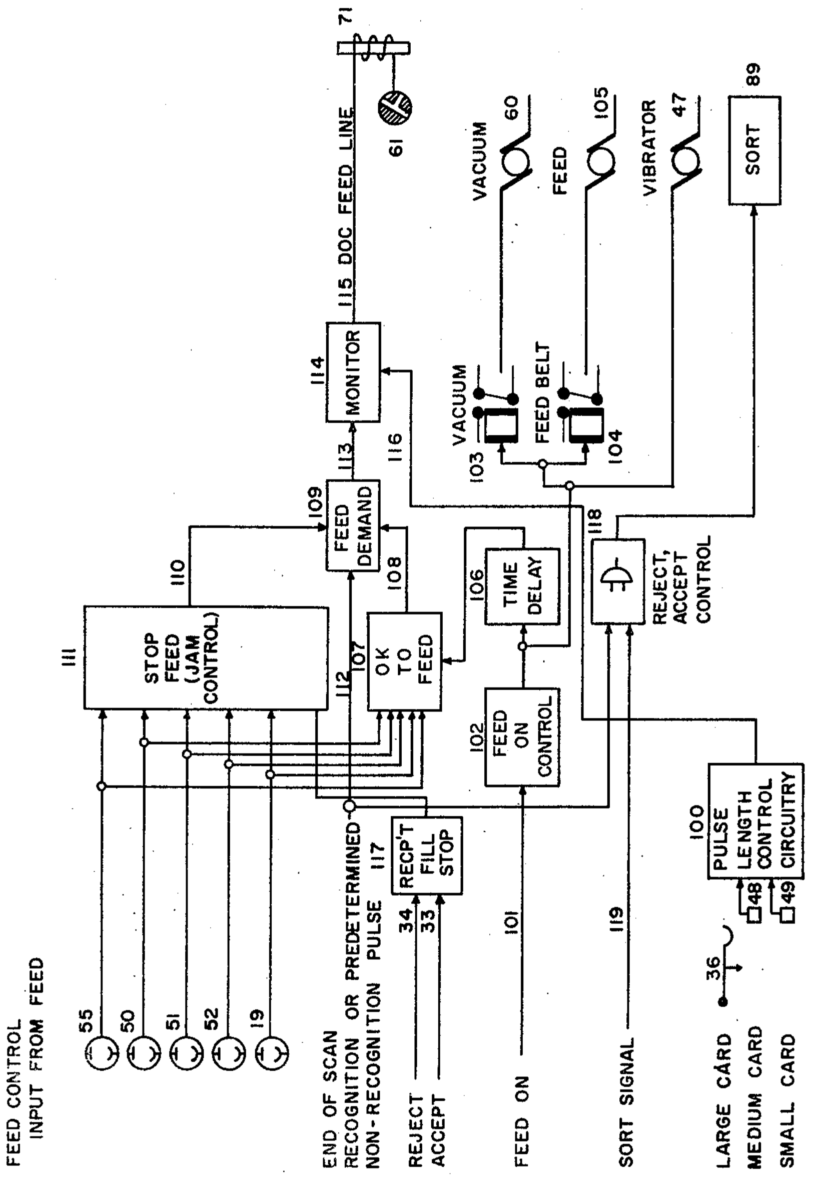

FIGURE 6*a* discloses one condition of a schematic plan view of switches 48, 49 and associated elements in FIGURE 4;

FIGURE 6*b* illustrates a second condition of a schematic plan view of switches 48, 49 and associated elements in FIGURE 4;

FIGURE 6*c* shows a third condition of a schematic plan view of switches 48, 49 and associated elements in FIGURE 4;

FIGURE 7 shows an isometric illustration of the friction drive and double-feed sensor assembly, located on FIGURE 1 in the area between the input hopper and output stackers;

FIGURE 8 shows an isometric illustration of the transport system in the accept and reject stack areas; and FIGURE 9 illustrates a schematic view of the electrical system.

The apparatus of the present invention is designed to effect reliable and rapid transport of documents, such for example, as elongated cards of approximately punch-card size, from an input hopper or stacker through the scanning station of automatic character reading machines and thence to either of two output bins or stackers which may be designated as "accept" and "reject" stackers. The characters, or a selected line or set of characters, on the document are optically scanned at the scanning station to produce scanner output signals responsive to photoelectric sensing of light reflected from the documents, which signals are detected to identify the characters scanned and generate outputs, for example in machine language, indicative of the characters scanned. Examples of such optical scanners are found in U.S. Patent No. 2,663,758, No. 2,897,481 or No. 2,978,590 granted to David H. Shepard, although it will be appreciated that many other forms of scanners may be employed. In the hereinafter described specific embodiment, the scanner may be assumed to be of the type employing an oscillating mirror which is rotated about a pivot axis to sweep or scan rectilinearly along the length or major axis of a suitably illuminated document at the scanning station and direct reflected light from the scanned zones of the document to a photoelectric detector which is responsive to the relative intensity of the light reflected from the document. Application for U.S. Letters Patent Serial Number 208,022 filed July 6, 1962, naming William A. Whitesell and Harvey L. Cook, Jr., as applicants discloses a scanner of this type. In addition to the line scanning of the document, detailed scanning of the character images along rectilinear lines produces output signal pulse patterns representative of the character shape.

In reading machines of the type disclosed in Shepard Patent No. 2,897,481, logical electrical circuits operating on the scanner output signals detect in these signals pulse patterns representative of selected character shapes. From the combination of shapes detected, the logical circuits either identify each character scanned or, in the case of a poorly imaged character, signal that the character is unrecognizable. In the preferred embodiment the reading machine is provided with logical circuitry responsive to failure to identify a character to provide upon a completion of a horizontal sweep, one of two pulses, either an accept pulse or a reject pulse. The accept pulse denotes that the information on the document has been recognized signifying that the document may be fed out of the scanning station and reject pulses indicate that one or more characters in the information on the document has not been recognized by the logic circuitry so the document will not be fed, but will be scanned again. Receipt of a predetermined number of reject pulses is caused to regulate when a document will be fed to a reject stacker as will hereinafter be described.

Referring to the drawings, wherein like reference characters designated corresponding parts throughout the several figures, the document feed system of the present invention which is schematically shown in FIGURE 2, comprises in general an input hopper or stacker 35 containing a supply of documents 44 to be scanned, a pair of output hoppers or stackers 22, 23 forming accept and reject hoppers, respectively, spaced transversely from the input hopper 35, and a document transport path extending between the input hopper and the output hoppers along which the documents are advanced one at a time. The documents are scanned by the sweep mirror 63 of the scanning assembly while the documents are in a stationary position at the front of the input stacker, and are then fed along the document transport path by continuously moving belts spaced longitudinally along the transport path and an intervening drive roller assembly to advance the documents into the accept or reject stackers.

Referring the illustrated structural embodiment, the input stacker 35 includes document tray holders 46 spaced above a supporting deck 11 for the feed system, on which the documents 44 are stacked, a guide assembly 43 and a transversely adjustable input stacker guide 36 laterally flanking the documents, a backup plate 46*a* bearing against the rear of the stack of documents, and a document support and guide 37 comprising horizontal members 37*a*, 37*b* and upright members 38 forming a frame against which the documents are held in a flat, planar condition while they are scanned. The input stacker guide 36 is manually adjusted lengthwise of the documents by adjusting knob 54 and a suitable common connecting mechanism 54*a* comprising a wire cable wound about a series of pulleys as illustrated, (FIGURE 4) to abut the adjacent side of the document stack for each size of document which is loaded in the hopper 35.

While the document is in the scanning position, that is, flush against support 37, the right-hand edge of said document is held by an air vacuum existing at holding port 45 which is connected through suitable tubing 45*a* by controlled gauges to a vacuum system 60. This holding action serves to maintain document stabilization during high-resolution scanning while in the input hopper 35. The holding port 45 is mechanically affixed to the adjustable input hopper guide 36 and thereby moves with said guide during adjustment of the guide in accordance with the document size, thus at all times enabling the holding port 45 to always act on the extreme right-hand edge of any size document.

The feed system used to transport document 44 after it has been scanned and recognized consists of a constantly moving belt 10, trained about suitable rollers 10', which has suitable holes spaced about one-half inch apart. The belt 10 passes in front of vacuum manifold 59, so that due to the spacing of the holes, a minimum of two of said holes are always over the manifold opening 12. This insures an instantaneous response from a document to the air vacuum when applied to the manifold opening 12, so that a document will only move upon an air vacuum pulse. The air vacuum is supplied to the manifold 59 from the vacuum system 60 via suitable tubing 59*a* through three-way valve 61 (see FIGURES 4 and 5). The air vacuum when appearing at opening 12 in the manifold 59 is, in all cases, at least twice the strength of the air vacuum supplied at the holding port 45, so that the document will follow the vacuum belt drive and be advanced a sufficient distance to pass the guide assembly 43 and be picked up by a first set of idler rollers 15 and 16 and drive roller assembly 39 (FIGURE 8). Attention is directed to the fact that the continuously moving belt 10 is recessed from the document to prevent an erroneous feed when an air vacuum is not applied to the manifold 59.

Figure 5:
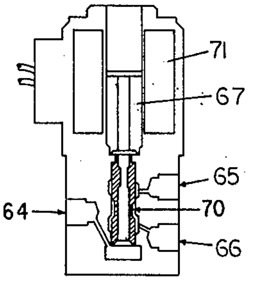
FIGURE 5 is a schematic sectional view of a three-way valve used in the preferred embodiment of the invention.

The three-way valve 61, which is a conventional commercial item, will be described with relation to FIGURE 5. When the three-way normally closed valve 61 is de-energized (off), the flow through the inlet port 65 from the manifold 59 is blocked by the downward position of the piston 69 due to a downward force on the plunger 67 which is mechanically linked to the piston assembly. In this position there is an opening through the center hole 70 in the piston from atmosphere inlet port 66 to the vacuum pump outlet port 64. When current is applied to the coil 71, the plunger 67 is moved upward. This upward movement causes the piston to close off atmosphere port 66 and open the air vacuum pump port 64 to the inlet port 65 and thereby to the manifold 59.

The pulse applied to the coil 71 of the three-way valve 61 is determinative of the length of time in which the air vacuum is supplied to the manifold 59 via vacuum system 60 and thereby the length of time use to physically drive a document 44 by the moving belt 10. One of the novel features of the instant invention is that the above pulse can be varied in accordance with the length of the document used. The apparatus for varying such a pulse is disclosed in FIGURE 4 (see also FIGURES 6*a*, 6*b*, 6*c* and 9), whereby the depending extension 36*a* of input stacker guide 36 is used as a contact actuator having three distinguishable conditions coacting with stationary snap-action switches 48, 49 mounted below the deck 11. When a large document is in the stacker 35, extension 36*a* will be in its extreme right position (FIGURE 6*a*) making no contact with snap-action switches 48 and 49 and thereby causing a 30 millisecond pulse to be produced responsive to the pulse length control circuitry 100 (FIGURE 9). When a medium size document is used in the stacker 35 (FIGURE 6*b*), the extension 36*a* will actuate snap-action switch 48 which will cause the pulse length control circuitry 100 to cause generation of a 25 millisecond pulse. If a small document is used in the stacker 35 (FIGURE 6*c*), the extension 36*a* will close snap-action switch 49 and 48 causing a 15 millisecond pulse to be generated. The advantages of such a system is to give a maximum feed suction impulse duration for larger sizes of document length and yet increase the speed of the feed system for smaller sized documents, thereby adding to the overall efficiency of the feed mechanism. Those skilled in the art will recognize that the duration of the pulse could have any suitable time length, and any number of contacts and/or switching mechanisms could be used. Alternative embodiments of the above could include photoresponsive elements, a rheostat or any number of items that could be substituted for the above switches. The associated circuitry is so designed that the pulse which is correlated to the card length will not activiate the coil 71 of the three-way valve 61 until gated by a pulse from the scanner on line 113 at the monitor unit 114 (see FIGURE 9) as will hereinafter be developed.

Another novel feature of the present invention lies in an input hopper end-of-document or empty shut-off switch (FIG. 1) which comprises a photocell receiver 55 and light source 56, which will initiate a signal at the photocell 55 when the last document has left the input stacker.

Figure 3:
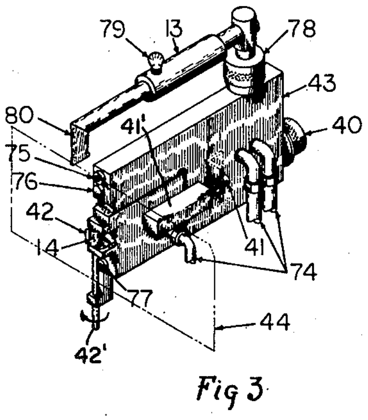
FIGURE 3 is an isometric view, as viewed from the path traveled by the document, of the guide assembly comprising a riffler, reversing roller assembly and air pressure guide vents.

Guide assembly 43 (FIG. 3) bounding the leading edge side of the documents in the input stacker 35 is used in several different aspects to properly guide a single document being fed as it advances in the initial phase of its transport path. The guide assembly 43 supports a riffler 13 having a discharge orifice 80 for directing a stream of air toward the upper edge of the first few documents 44 in input hopper 35. This stream of air serves to assist in separating the document about to be fed from those immediately behind it. Air pressure from the exhaust of the vacuum pump is fed through suitable adjustment means (not shown), then to input tubes 74, into the riffler arm 13, then through spout or orifice 80. It is noted that the riffler 13 is mechanically adjustable to have varied positions by use of ball joint 78 and screw means 79. The guide assembly 43 also has openings 75, 76 and 77 which are pressure air fed, from the exhaust of the vacuum pump by means of suitable tubing and control gauges via tubes 74 to further aid in the feeding and transportation of those documents having uneven or irregular edges which might otherwise not be fed. Either opening 75 or 76 is used, depending upon the height of the document to be used. Also incorporated in the guide assembly 43 is a slide assembly 41' which is movable transverse of the document feed path for positioning an attached reversing roller 14 by way of adjusting dial 40 to control the document path opening as defined by the roller 14 and guide wall 37, in accordance with the thickness of the document to be fed. The slide assembly 41' also contains a gate 42 supported thereon for movement relative to the slide assembly by way of adjustment knob 41. By properly adjusting the gate 42 to pass a single document through the feed path, a second document stuck to the rear of the document to be fed will in most cases be prevented from the input hopper. However should the second document erroneously be fed with the first document past gate 42 then, if properly adjusted, reversing roller 14, rotatably driven by shaft 42' in the direction indicated by the arrow as shown in FIGURE 3 will engage the second document to bias the movement of the same back toward the input hopper. Reversing roller 14 is seen to have a small diameter (.28 inch) and is positioned so close to the documents 44 in the input hopper 35 so that a second document, when stuck to a first, will be abutted by the reversing roller 14 and will move such a minimal distance from the input hopper that the information, on the second document, to be scanned will still lie within the zone scanned by the optical scanner or like mechanism.

Other features located at the input hopper area (FIGS. 1 and 2) include upright extensions 38 of the support 37 in which are located vertical slots used to position a guide rail 37*b*, having an antiskew guide rabbet 58, according to the height of the document being transported. The rabbet 58 runs the length of the guide rail 37*b* and has right-angle surfaces to bear against the front and top of the upper edge portion of the card at the scanning station to prevent skew orientation of the document. A vibrator 47 (FIG. 4) is adjustable by way of knob 53 on a variable A.C. voltage transformer 47' so that the voltage can be increased or decreased to change the amplitude of the vibration as required. Vibrating bars 47*a* attached to the vibrator 47 are mechanically connected to the document tray holders 46 in the input hopper 35, thereby aiding in alignment of the documents and ease of document separation. The riffler 13 (previously described) and the vibratory assembly together form a system to properly stack the documents 44 in the input hopper 35 before being fed.

Further along the document feed path is a photocell 50 (FIGS. 1, 7 and 8) and a constant light source 81 directly opposite said photocell and on the other side of said feed path, so that when the leading and/or trailing edge of a document has failed to pass by the photocell 50, after a prescribed time from the scanning of the information on a document while in the input stacker, then a pulse is initiated to indicate that a document failure has occurred and the machine is shut off. In an alternative embodiment photocell 50 could also be used for reenergizing the vacuum drive only upon a failure of the document to depart from the input hopper area and only after the document has been recognized, thereby machine stoppage due to feed failures may be reduced.

A second photocell 51 (FIGS. 1, 7 and 8) and light source 82 is encountered by the document as it travels down the feed path toward the output stackers 22 and 23, whereby when the leading and/or trailing edge of the document has failed to pass by the photocell 51 after a prescribed time period from document passage by the previous photocell 50, then a pulse is initiated that stops the machine and indicates a document jam. The photocell 51 is located adjacent a pivoted gate 24 for shutting off the machine if the document is jammed at gate 24 as the trailing edge of the document will fail to pass said photocell. The gate 24 is pivoted on or adjacent a guide plate 24 along the document feed path at a position to selectively direct the documents into either the accept receptacle 22 or reject receptacle 23.

The nomenclature "accept" and "reject" are well known in the art and used to make reference to intelligence-bearing documents that have been respectively recognized (accepted) by logic circuitry and not-recognized (rejected) by logic circuitry (see FIGURE 9, sort signal 119), thereby the output receptacles for the documents are referred to as accept receptacles and reject receptacles.

The document then finally approaches gate 24 which is normally in the open position, that is, gate 24 is withdrawn in the inset 87 in plate 40, and a path is formed for the document between said gate 24 and stationary guide 88 allowing the document to travel into the accept receptacle 22 between the conventionally spring loaded (not shown) stacker plate 26 and adjustable idler assembly 28*a*. The said idler assembly which allows for an appropriate document opening, is part of the belt drive 27*a* which operates at a somewhat higher velocity than the drive roller assembly 39 and second belt drive 85 driven as indicated at 86, so that a proper stacking of the documents is insured between the stacker document guides 26 and 29.

At this point, attention is directed to the fact that the speed of the document at the drive belt 10 is 33 inches per second whereas at the first set of idler rollers 15, 16, drive roller assembly 39, (see FIGS. 7 and 8) and the second drive belt 85, the speed of the document is about 100 inches per second and the speed of belt drives 27*a*, 27*b* is slightly higher than 100 inches per second. Experience has shown that this arrangement insures virtually instant document pickup with gradual acceleration and allows for rapid stacking in the output receptacles.

Accept-reject gate 24, normally open, will be closed, that is, positioned against guide 88 thereby to form a path for the document between said gate and inset 87 upon energization of a solenoid 89 by a delayed document reject signal. Said document reject signal is initiated by the reading machine due to a non-recognition of the information on the document scanned at this reading station, thereby a document path is formed to the reject receptacle 23 between idler rollers 31*a* conveniently spaced, and second belt drive 85, so that the document is always in contact with at least one of said rollers, then via curved guides 91 and 92. At this point, belt drive 27*b*, 28*b* and receptacle stacker plates 25, 30, both cooperate to stack the document in the same manner described with reference to the aforesaid accept receptacle stacking system. A further photocell 52 having a light source opposite (not shown) is positioned in the above path between rollers 31*a* as shown in FIGURE 7, and is used to monitor the reject document feed upon a reject signal from the reading machine, whereby if the leading and/or lagging edge of a reject document does not pass said photocell, then the machine is automatically shut off as the document is most likely to be jammed in the machine, thereby allowing an operator to remove the incorrectly fed document. Photocell 52 will therefore, in view of the above, initiate a signal to shut the machine off when a rejected document is transported to the accept receptacle, or even when an accepted document is transported to the reject receptacle as an improper signal would be formed at said photocell in this case.

FIGURE 4 discloses two snap action switches 33 and 34 located beneath the output receptacles 22 and 23. When the depending extensions 94 and 95 of the receptacle stacker plates 25 and 26 come into engagement with said snap action switches upon a fill of either the output receptacles 23 or 22 (FIGURE 1), then an automatic shut-off of the machine will occur. Additionally a stacking bar 96, common to each output hopper or stacker 22 and 23, is adjustable toward and away from the guide plate 40 along a rectilinear path defined by depending extensions 97 (FIGURE 4) movable on guide rods **97*a* which are tied to cable wire 54*a*, to vary the position of stacking bar 96. Thus, by properly adjusting knob 54, cable wire 54*a* will simultaneously move input stacker guide 36 together with stacking bar 96 in equal amounts to provide a feed system that is compatible with the length of the documents being loaded in the input hopper 35**.

An important feature of the present application is an electro-mechanical double feed sensor, used to shut off the machine when two documents have failed to be separated or are attached by some mechanical means such as a staple. The sensor is comprised of the idler roller 15 (FIGURE 7) mounted on one arm **17*a* of a lever 17 having a second arm 17*b*, the lever pivot being located at stud 91, and the arm 17*b* having a 10:1 mechanical advantage with relation to the arm 17*a* carrying the roller 15. At the end of arm 17*b* is a shield plate 18 that shields a photocell 19, mounted on an adjustable mount 20 having a fine graduated dial knob 21, from a light source 83. The photocell 19 is normally exposed to the light source 83. However, when two or more documents are attached and pass by roller 15, the thickness dimension of the documents moves said roller 15 in a counterclockwise direction about pivot 91, thereby moving the shield plate 18 and arm 17*b* against the force of a set spring 84 in a direction so as to block off the light source 83 from photocell 19 and thereby initiate a machine shut off. The dial 21 which is easily accessible to the operator and controls the adjustable mount 20 for photocell 19**, can be adjusted for various thicknesses of the paper and card stock, and usually in operation is set for the thickness of the document to be processed.

Referring now to FIGURE 9 showing a schematic of exemplary electrical system components which may be used with the present invention, and to FIGURE 2, illustrating the various positions of the electro-optical components of the document feed system, the system may be placed in an ON condition by application of a voltage to line 101 which activates a "feed-on" control circuit 102. The "feed-on" control circuit 102 applies supply voltage immediately to the vacuum solenoid 103 which applies power to the vacuum pump 60, the feed belt drive control solenoid 104 controlling feed motor 105 and to the vibrator 47 for a suitable warmup period determined by time delay 106, after which supply voltage is applied to the other system components. The "feed-on" control circuit 102 conditions the "O.K. to feed" logic circuitry 107 which is responsive to the condition of the photocells 19, 50, 51, 52 and 55, to maintain a selected voltage condition on the line 108 when all of the signals received from the photocells 19, 50, 51, 52 and 55 are normal, indicating that the documents are being fed and transported to the output receptacles without any difficulty. The line 108 constitutes one of the inputs to a "feed demand" circuit 109, which also responds to a selected voltage condition on the line 110 from the "stop feed" circuit 111 occurring when all of the photocells are in normal condition and to a pulse on line 112 generated in a conventional manner by the automatic character reading machine signifying recognition by the scanner of information read from the document or signifying the end of a predetermined number of scans if the information is not recognized. If normal signals are present on the inputs 108 and 110 to the feed demand circuit 109, the occurrence of a pulse on the input 112 will cause the "feed demand" circuit 109 to initiate a positive signal on line 113 to a monitor circuit 114 serving as a gate to admit pulses having a duration dependent upon the length of the documents used to an output document feed line 115 leading to the solenoid 71 of the three-way valve 61.

The pulse length control circuitry 100 determines the time of closing of the gate formed by the monitor 114 in accordance with the condition of the switches 48, 49, and may, for example, be formed of a set of R.C. circuits or a capacitor and a set of resistors regulated by the condition of the snap-action switches 48, 49 wherein the capacitor is allowed to discharge through different resistor combinations upon opening of the monitor gate to regulate the "ON" time of the monitor 114. The exponentially decaying output of the pulse length control circuit 100 applied to monitor 114 through lead 116 turns off the gate after selected time periods determined by the time constant of the R.C. circuit established by the switch conditions.

Additionally, the "stop feed" circuit 111 is operative to establish a voltage condition on the line 110 responsive to occurrence of an abnormal signal from any of the photocells 19, 50, 51, 52 and 55 or from the receptacle fill stop circuit 117 which is controlled by the snap-action switches 33 and 34 to disable the "feed demand" circuit 109 from applying a gate opening signal to the monitor 114 when any abnormal conditions are signified. Also, a reject, accept control circuit 118 is responsive to signals from lead 112 and to sort signals applied along lead 119 signifying acceptance or rejection of the document to condition the sort solenoid 89 to locate the gate 24 so as to direct the associated document into the accept receptacle 22 or the reject receptacle 23.

It is evident that the machine will be put in a shut-off condition when:

(a) Photocell 55 detects a document void at the input hopper, or (b) Photocell 51 detects a document jammed at the accept gate 24, or (c) Photocell 19 via roller 15 senses double feed of documents, or (d) Photocell 52 senses an accepted document advancing into the reject receptacle stacker, or (e) Photocell 52 senses a rejected document advancing into the accept receptacle stacker, or (f) The reject or accept receptacle stackers are filled, (g) Photocell 50 senses that the leading and/or trailing edge of a document has failed to pass by after a prescribed period of time from the termination of reading certain information on a document.

It is additionally noted that a cut-out 57 (FIGURES 1 and 8) may be located in one edge of the guide plate 40 to provide for facilities to read characters on the document where said document is "on the fly," thus allowing for further reading and/or monitor purposes.

In the above described invention attention is directed to the fact that the exhaust of the vacuum pump or system is the sole source of the air pressure used, and further that only one drive motor is used for the feed system, being connected by suitable reduction gearing and belts to the various drives.

*Operation*

The following will cover the operation of the apparatus described heretofore with respect to a document feed.

The documents 44 are first inserted into the input hopper 35, and input hopper guide 36 is then manually adjusted according to the length of the documents 44 via adjustment mechanism 54. During this adjustment, the depending extension 36*a* of stacker guide 36 will be moved into one of the positions shown in FIGURES 6*a*, 6*b* and 6*c*, conditioning the pulse length control circuitry 100 to cause the proper vacuum pulse length to be applied to vacuum drive at manifold 12 via the three-way valve 61. A system, including an air pressure application to the documents 44 from riffler 13 and a vibrator application to the documents 44 from vibrator 47 via connecting bars 47*a* will aid in alignment and separation of the documents 44. In the disclosed embodiment, an optical scanner mirror 63 is used to scan or read certain information from the documents as heretofore described.

It is noted that a vacuum pulse is applied at port 45 opposite the document being scanned so as to hold the document in a stabilized condition. Normally, the information scanned from the document will be recognized by the scanner circuitry, thereby applying a pulse at the end of the scan, via line 112 (FIGURE 9) to "feed demand" circuit 109, assuming that the photocells 19, 50, 51, 52 and 55 are in a normal condition. Voltages will be present on lines 110 and 108, so that the "feed demand" circuit 109 on occurrence of the three aforesaid signals will initiate a pulse on line 113 to the monitor 114. The voltage generated by circuitry 100, determinative of the document length, times the gating by monitor 114 of the signal to energize the solenoid 61 of three-way valve 61 in accordance with document length, thereby presenting at manifold opening 12 a vacuum pulse which is applied to the document 44 via the holes 11 in continuously moving belt 10. The vacuum draws the document to the travelling belt 10 by a sucking action and feeds the document past guide assembly 43 to drive roller assembly 39 and idler rollers 15 and 16. The guide assembly has adjustments 40 and 41 for gate 42 and reversing roller 14, respectively, to regulate the guide assembly openings so as to allow only one document (the scanned document) to pass at any one time. Guide assembly 43 is also used to apply an air pressure via vents 77, and either 75 or 76 (depending upon the document height), so as to facilitate the feed of those documents having uneven or irregular edges. As the document passes by the guide assembly 43, it is fed between idler rollers 15, 16 and drive roller assembly 39, simultaneously passing in front of photocell 50. If a second document should be attached in some manner to the scanned document, then the additional thickness of said attached document would force idler roller 15 on lever 17 in a counter-clockwise direction thereby shielding light source 83 from the photocell 19 to shut the machine off, so that the operator can remove the attached document. Photocell 50 will initiate a machine shut-off if it does not see the leading and/or lagging edge of the scanned document. Assuming that the scanned document passes by drive roller assembly 39 in its normal manner, the document will then travel between idler roller 31*c* and transport belt 85 and then through the path formed by gate 24. Gate 24 is normally positioned in the inset 87 of guide plate 40, allowing the document to travel between gate 24 and guide 88 into the accept stacker 22 where it is stacked by the drive assembly consisting of idler roller 28*a* and belt drive 27*a*. However, when a document has not been recognized by the scanner circuitry, even after a predetermined number of scans, then after the document feed is initiated by a signal on line 112, a non-recognition pulse is applied to line 119 which energizes the sort solenoid 89 to move the gate 24 against guide 88 and form a path for those non-recognized documents between gate 24 and guide plate 40 via idler rollers 31*a* and belt 85, between curved guides 91 and 92 into the reject stacker 23, having a similar drive assembly for stacking the documents as disclosed in the accept stacker. Photocells 51 and 52 provide monitoring devices for machine shut off in case of a document feed failure.

It should be understood, of course, that the foregoing disclosure encompassing a true demand type feed system, relates to only a preferred embodiment of the invention and that numerous modifications or alterations may be made therein without departing from the spirit and scope of the invention as set forth in the appended claims.

What is claimed is:

1. A system for feeding variable size documents comprising input hopper means for accommodating a supply stack of documents of varying lengths, moving feed means for feeding one of the documents at a time from the supply stack along a feed path, said moving feed means being normally ineffective to feed documents along said path, means for activating said feed means to be effective to feed documents for predetermined periods of time, said input hopper means including means for sensing the length of the documents while in the supply stack, and means responsive to the sensing of the lengths of the documents in the supply stack for varying the time duration of activation of said feed means in preselected relation to the length of the documents.

2. A system for feeding documents of various lengths along a feed path from an input hopper for a supply stack of documents comprising feed means for feeding the documents one at a time along the feed path, and means in said input hopper adjustable in accordance with the length of documents in said input hopper responsive to contact with an edge of the documents for activating said feed means to feed the documents along said path for different predetermined periods of time dependent on the length of the documents.

3. A system for feeding documents along a feed path, comprising vacuum means movable along the feed path for feeding said documents one at a time along the feed path, means for activating said vacuum means for different predetermined periods of time, length sensing means adjustable lengthwise of the documents to engage an edge of the document while the same occupies a stationary position at a location along the feed path and sense the length thereof, and means responsive to adjustment of said length sensing means for selecting said predetermined time periods in accordance with the length of the document sensed.

4. A system for feeding information bearing documents positioned in an input hopper comprising means for advancing said documents one at a time along a feed path from the input hopper including a constantly driven belt having feed holes therein and being located adjacent the input hopper in spaced relation to the documents therein, a controlled vacuum source, means for applying a vacuum for a plurality of different predetermined time periods from said source to said belt adjacent said feed holes to draw documents into contact with the belt and feed the document, means for sensing the length of the documents while in said input hopper, and means automatically controlled by said last-mentioned means for making said predetermined time periods dependent upon the document length.

5. A system for feeding information bearing documents comprising an input hopper for the documents, feed means for advancing said documents one at a time along a feed path from the input hopper including a constantly driven belt having feed holes therein and being located adjacent the input hopper in spaced relation to the documents therein, a controlled vacuum source, means for applying a vacuum for a plurality of different predetermined time periods from said source to said belt adjacent said feed holes to draw documents into contact with the belt and feed the document, means for sensing the length of the documents while in said input hopper, means automatically controlled by said last-mentioned means for making said predetermined time periods dependent upon the document length, means for applying the vacuum to said feed holes only after the completion of a selected processing operation upon the information on one of the documents in the hopper, holding port means facing the document being processed in the input hopper, and means for applying vacuum to said holding port means to maintain the document being processed in a stabilized condition in said input hopper during the period of the processing operation thereon.

6. A system for feeding information bearing documents along a feed path comprising an input hopper for storing documents to be fed, a driven belt adjacent the feed path and spaced from said documents to be fed and having closely spaced holes, manifold means for applying a gated vacuum pulse to said driven belt to activate the same for feeding one of said documents along said feed path, means for varying the length of the vacuum pulse, said means being dependent upon the length of the document being processed and including an input hopper guide member adjustably positioned in said input hopper in accordance with the length of the documents and a switching mechanism which is varied by the position of the input hopper guide member to automatically select different vacuum pulse lengths in accordance with the document length indicated by the position of said guide member.

7. In a system for feeding documents, means for advancing a document along a feed path, and adjustable document thickness sensing means located to sense total thickness of documents at a selected zone along the feed path for automatically effecting feed shut off when more than one document is advanced into said selected zone at any one time, said document thickness sensing means comprising a pivoted lever including a pair of arms having an idler roller on a first arm thereof located adjacent the feed path to engage documents at said zone and a mechanism responsive to the position of an end of a second arm of said lever to effect feed shut off upon preselected displacement of said other arm.

8. The apparatus recited in claim 7 including photocell means and a light source stationed adjacent the end of said second lever arm, said end having a light shield thereon normally disposed to expose said photocell means to said light source and movable responsive to excessive document thickness at said zone to shield the photocell means from the light source and effect feed shut off.

9. A system for feeding information bearing documents located in an input hopper comprising vacuum means for feeding one of said documents at a time from said hopper, means for activating said air vacuum means for a plurality of different predetermined periods of time, means for sensing the length of said documents while in said input hopper, means responsive to said last-mentioned means for selecting one of said predetermined time periods in preselected relation to sensing of the length of the documents, an adjustable document thickness mechanism for preventing more than one document to be fed at any one time, document thickness sensing means for initiating feed shut off when more than one document is advanced at any one time, and a transport system having successive stages of increased speed for rapid stacking of documents.

10. A document feeding system comprising a document feed path, an input hopper adjacent said path for storing a stack of information bearing documents, an output hopper for said documents, means for advancing said documents along said path from said hopper to said output hopper, means producing a first localized suction zone at a stationary location adjacent the endmost document in said stack nearest the feed path to stabilize the endmost document while performing a reading operation thereon, a continuously driven belt and air vacuum means for feeding said documents from said hopper one at a time after said reading operation including means for producing a second localized suction zone stronger than said first suction zone adjacent an exposed face of said endmost document to draw the document into driven contact with the belt, means for activating said air vacuum means for predetermined periods of time dependent upon the document length, means for separating and aligning said documents in the input hopper comprising an air riffle system and a vibrator, means for preventing more than one document to be fed at any one time including a gate mechanism and a reversing roller along said feed path spaced from the input hopper, document thickness sensing means for initiating feed shut off when more than one document has been advanced to a preselected position along the feed path at any one time, said last-mentioned means being adjustable for various document thicknesses, and said means for advancing the documents comprising successive stages of increased speed progressing from said input hopper to said output hopper for rapid document stacking.

11. The method of feeding variable length documents from a document supply stack along a feed path comprising the steps of sensing the length of the documents while in said stack, producing a localized suction zone adjacent an exposed face of an endmost document in the stack, causing the localized suction zone to travel along the feed path to withdraw the endmost document therefrom and advance the same along said path, and automatically varying the time duration of said suction zone in preselected relation responsive to the sensing of the length of the documents to vary the document feed distance.

12. The method of feeding variable length documents from a document supply stack along a feed path comprising the steps of sensing the length of the documents while in said stack, moving a driving belt along said feed path in a plane spaced from an endmost document in said stack, producing a localized suction zone adjacent an exposed face of said endmost document to draw said document into driven contact with the belt, causing the localized suction zone to travel with the belt along the feed path to advance the document therewith, and automatically regulating the time duration of said suction zone in preselected relation responsive to the sensing of the length of the documents to vary the distance documents are advanced by the belt in accordance with the length of the documents.

13. The method of feeding variable length documents from a document supply stack along a feed path comprising the steps of sensing the length of the documents in said stack, moving a driving belt along said feed path in a plane spaced from an endmost document in said stack, producing a first localized suction zone at a stationary location adjacent said endmost document to stabilize the same for a selected period, producing a second localized suction zone stronger than said first suction zone adjacent an exposed face of said endmost document to draw said document into driven contact with the belt, causing the second localized suction zone to travel with the belt along the feed path to advance the document therewith, and automatically regulating the time duration of said second suction zone in accordance with the sensed document length to vary the distance documents are advanced by the belt in preselected relation to the length of the documents.

14. The method of feeding variable length documents from a document supply stack one at a time along a feed path comprising the steps of sensing the length of the documents while in said stack, applying a driving force to the endmost document in the stack causing the document to travel along said feed path, and automatically varying the time duration of the application of said driving force in preselected relation responsive to the sensing of the length of the documents to be fed.

15. The method of feeding variable length documents from a document supply stack one at a time along a feed path comprising the steps of adjusting the document supply stack to physically allow for the document length whereby automatically sensing said length of the documents, applying a driving force, which is varied in time duration, responsive in preselected relation to said sensing of the length of the documents, to cause said endmost document to travel along said feed path.

References Cited by the Examiner

UNITED STATES PATENTS

| | | | |
|---|---|---|---|
| 2,813,716 | 11/57 | Janke | 271—26 |
| 2,849,232 | 8/58 | Halahan et al. | 271—29 |
| 2,856,187 | 10/58 | Burckhardt et al. | 271—26 |
| 2,884,130 | 4/59 | Bosch | 209—111.5 |
| 2,970,537 | 2/61 | Wardwell et al. | 271—8 X |
| 2,988,355 | 6/61 | Rabinow et al. | 271—57 X |
| 3,025,051 | 3/62 | David et al. | 271—34 X |
| 3,089,697 | 5/63 | Brozo | 271—89 X |

ROBERT B. REEVES, *Primary Examiner.*

RAPHAEL M. LUPO, *Examiner.*